S. C. COX.
SIGNATURE STUFFING MACHINE.
APPLICATION FILED AUG. 3, 1905.
1,043,401.
Patented Nov. 5, 1912.
12 SHEETS—SHEET 1.
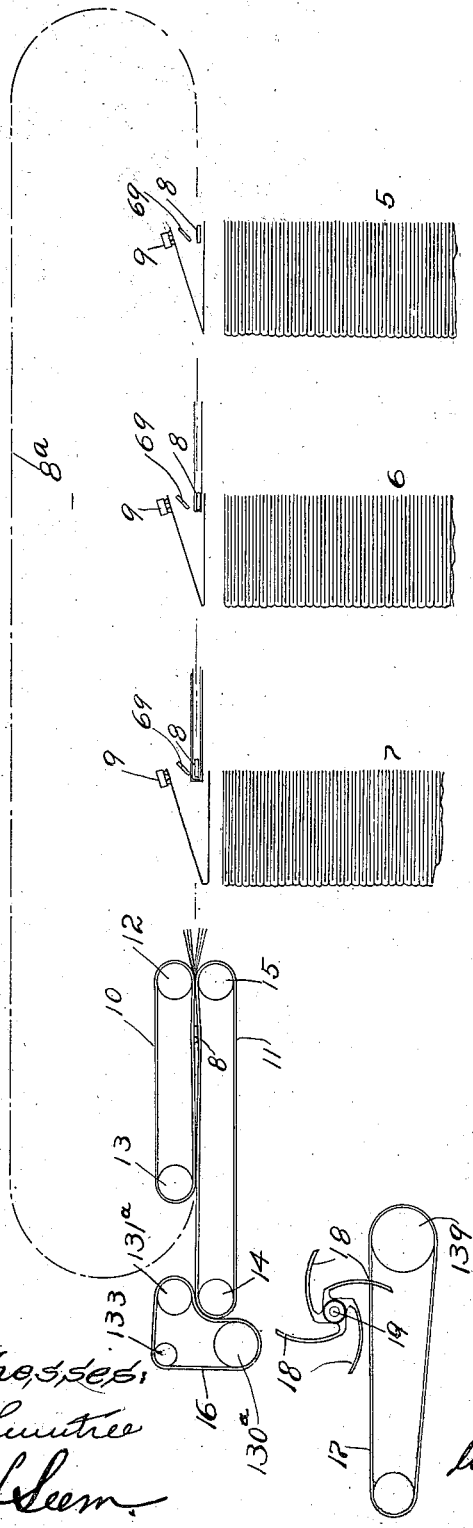
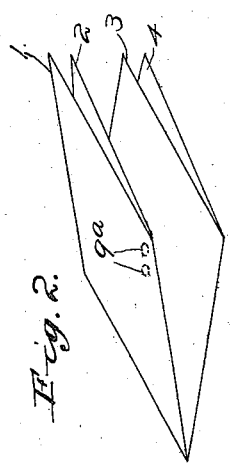

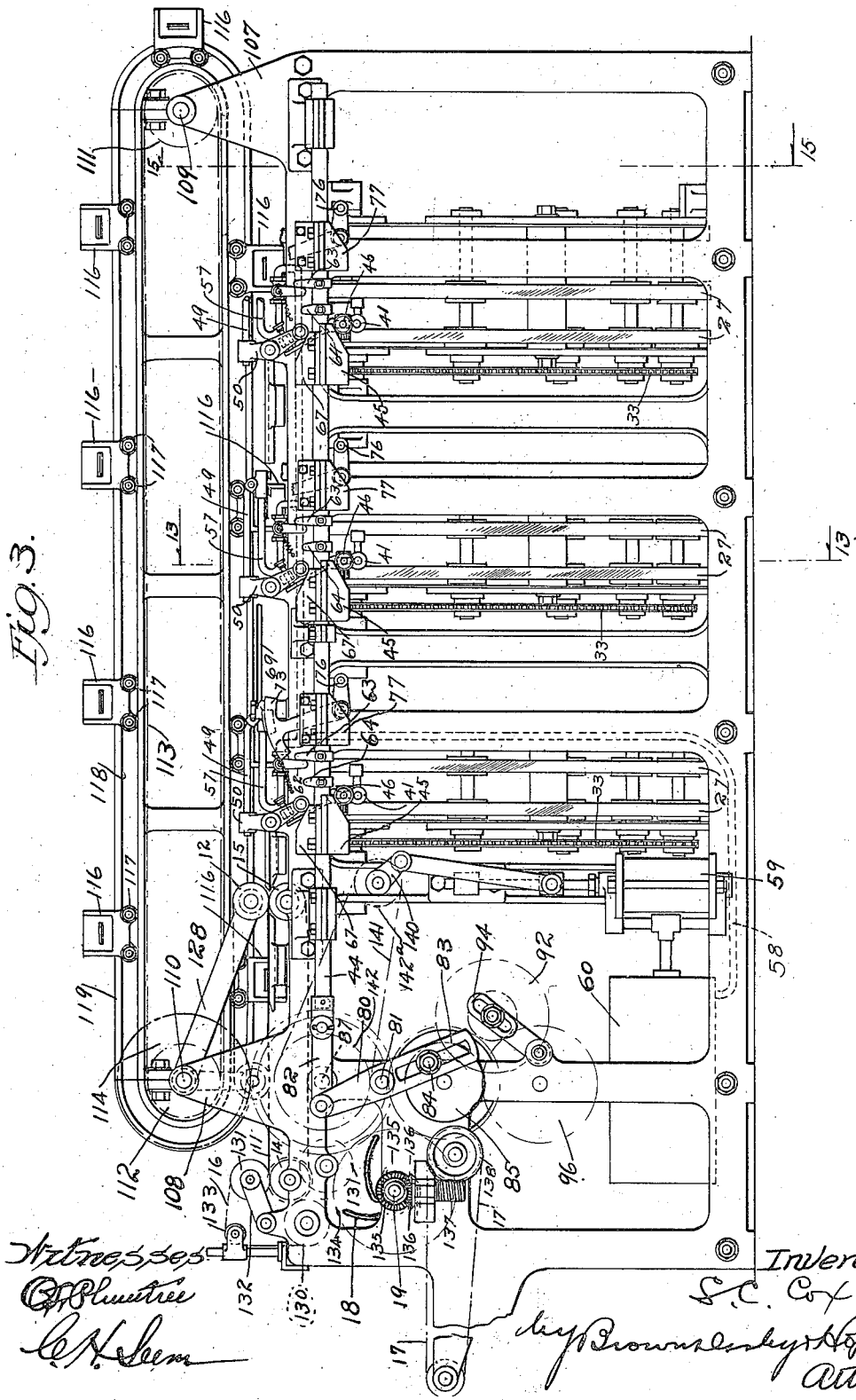

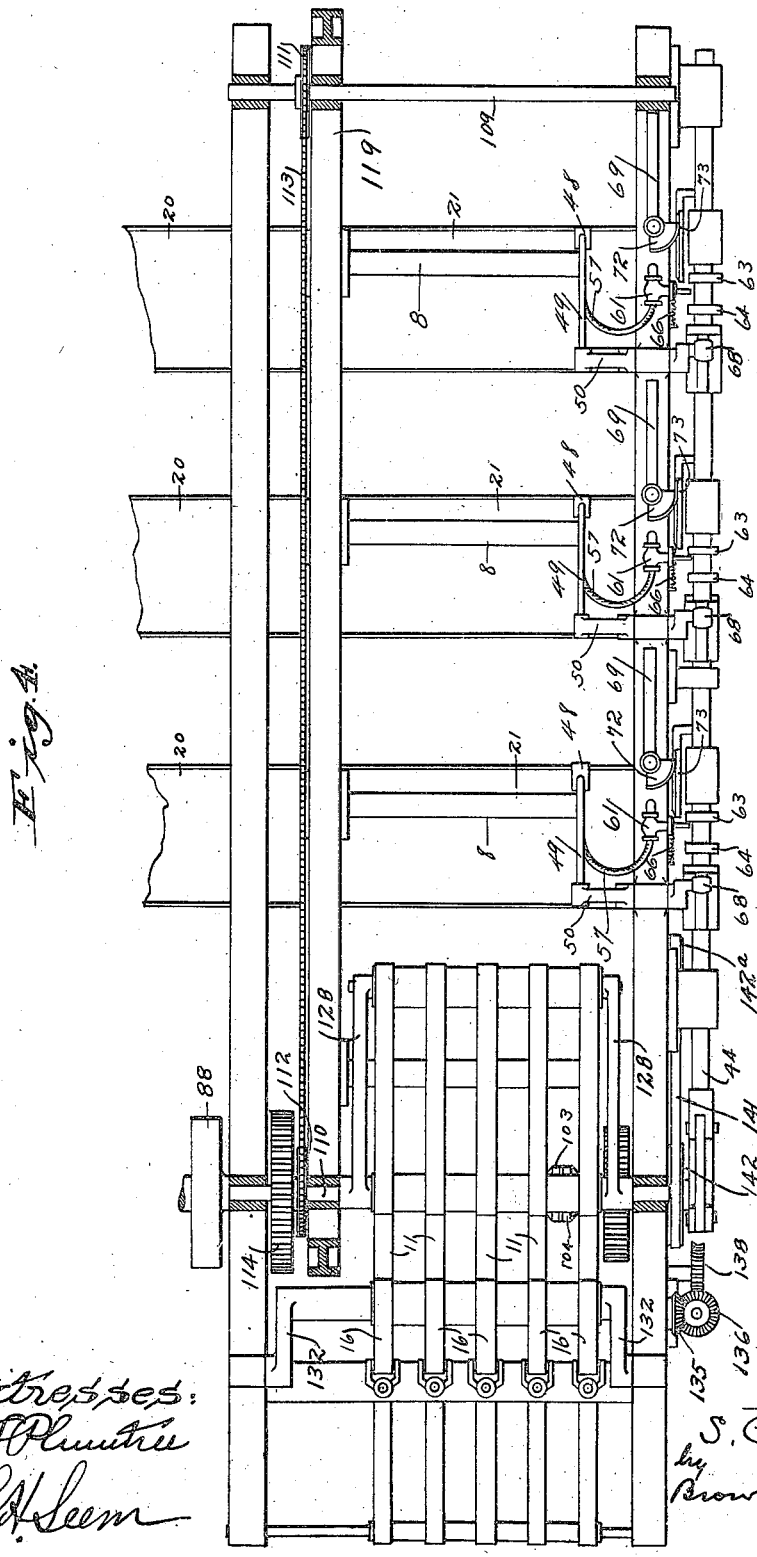

S. C. COX.
SIGNATURE STUFFING MACHINE.
APPLICATION FILED AUG. 3, 1905.

1,043,401.

Patented Nov. 5, 1912.
12 SHEETS—SHEET 4.

Witnesses:

Inventor:
S. C. Cox

S. C. COX.
SIGNATURE STUFFING MACHINE.
APPLICATION FILED AUG. 3, 1905.

1,043,401. Patented Nov. 5, 1912.

12 SHEETS—SHEET 5.

Witnesses:
Inventor:
S. C. Cox

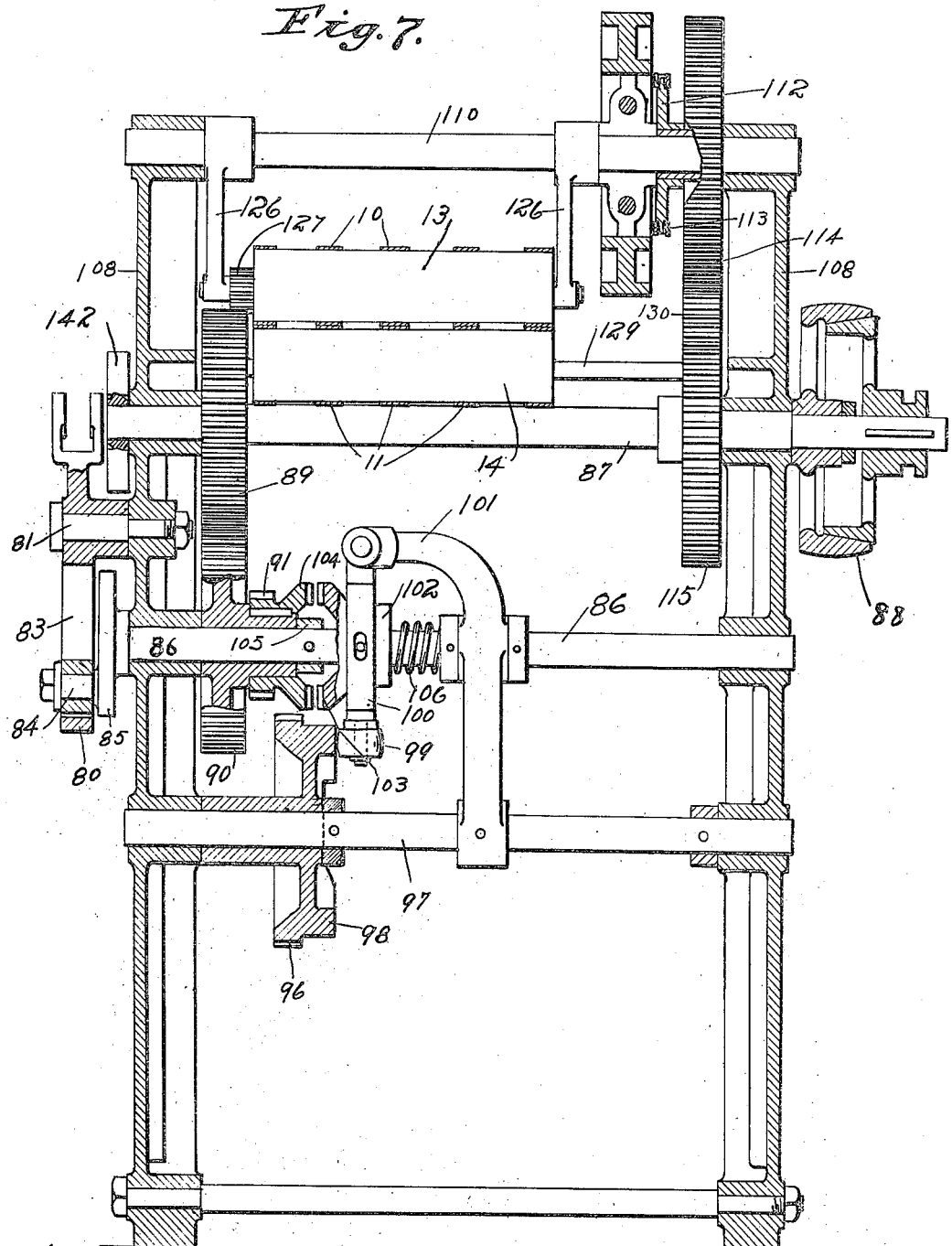

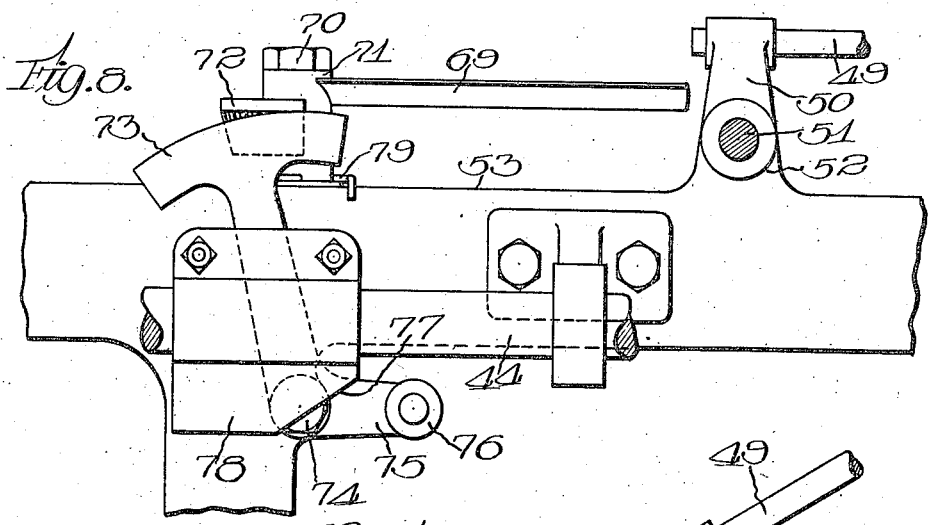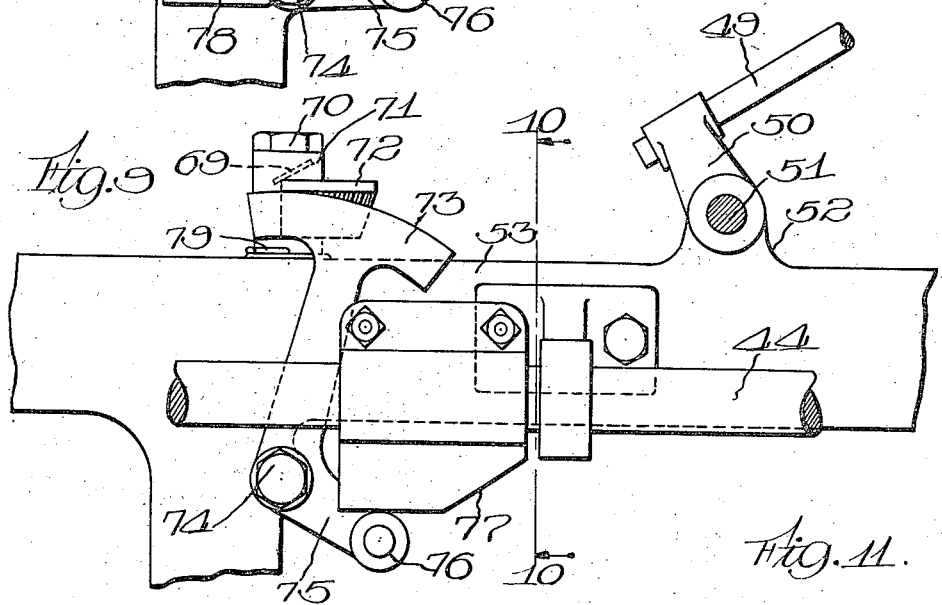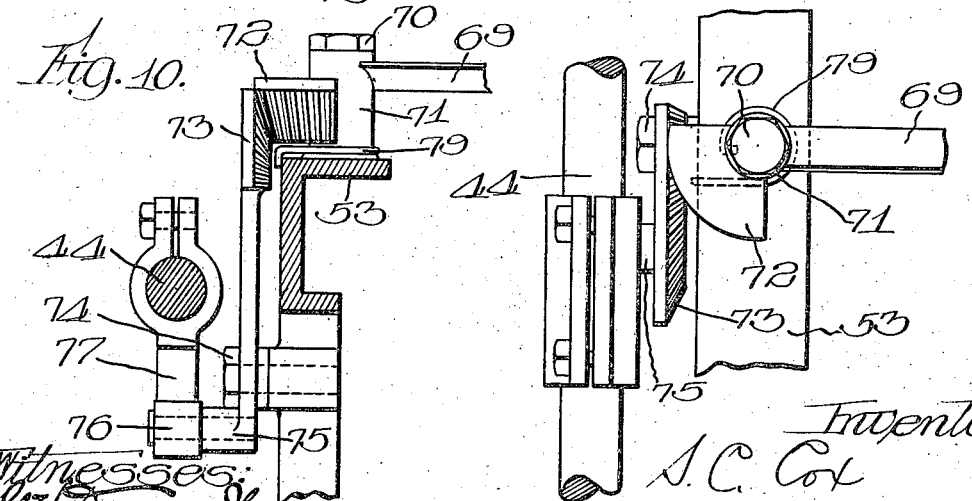

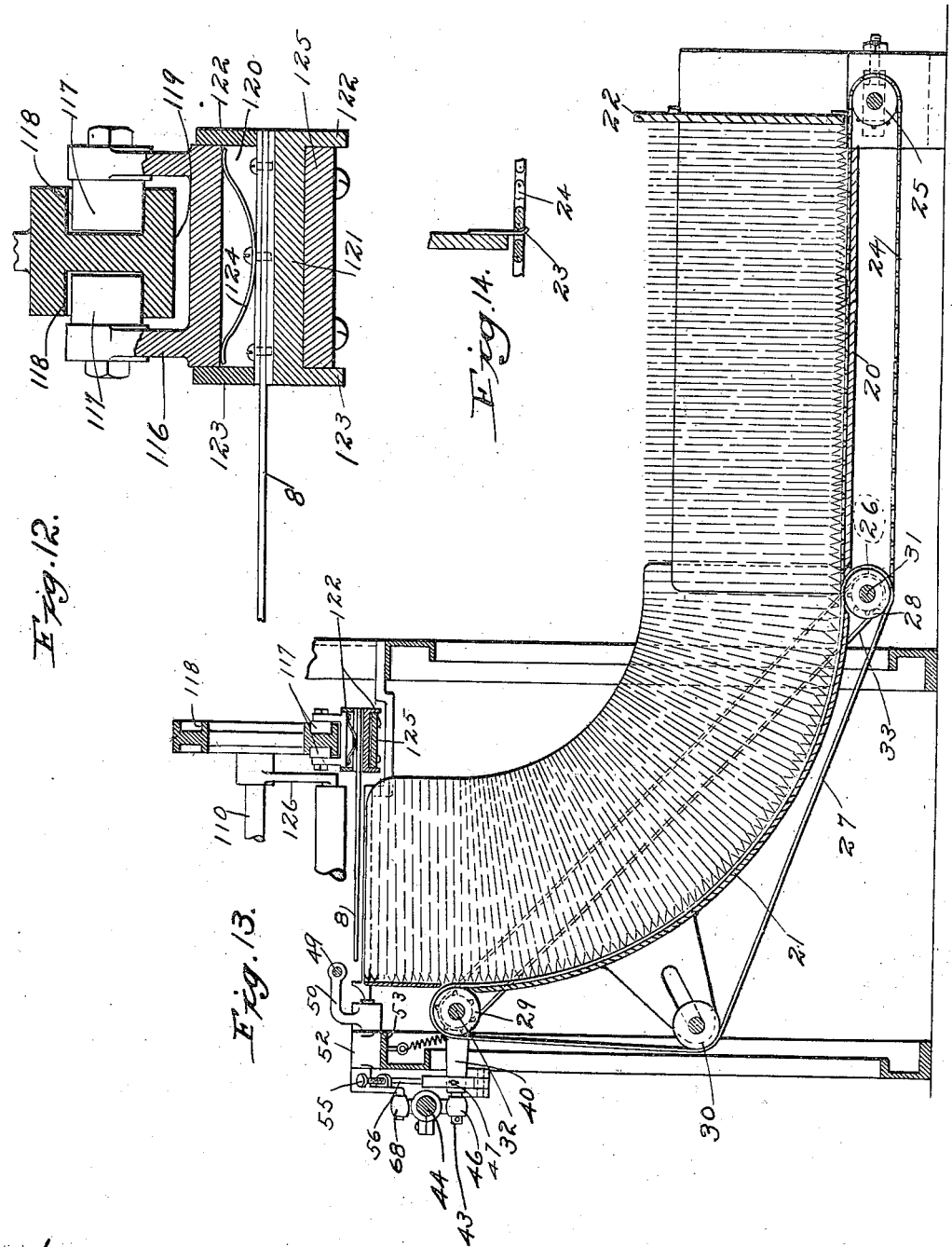

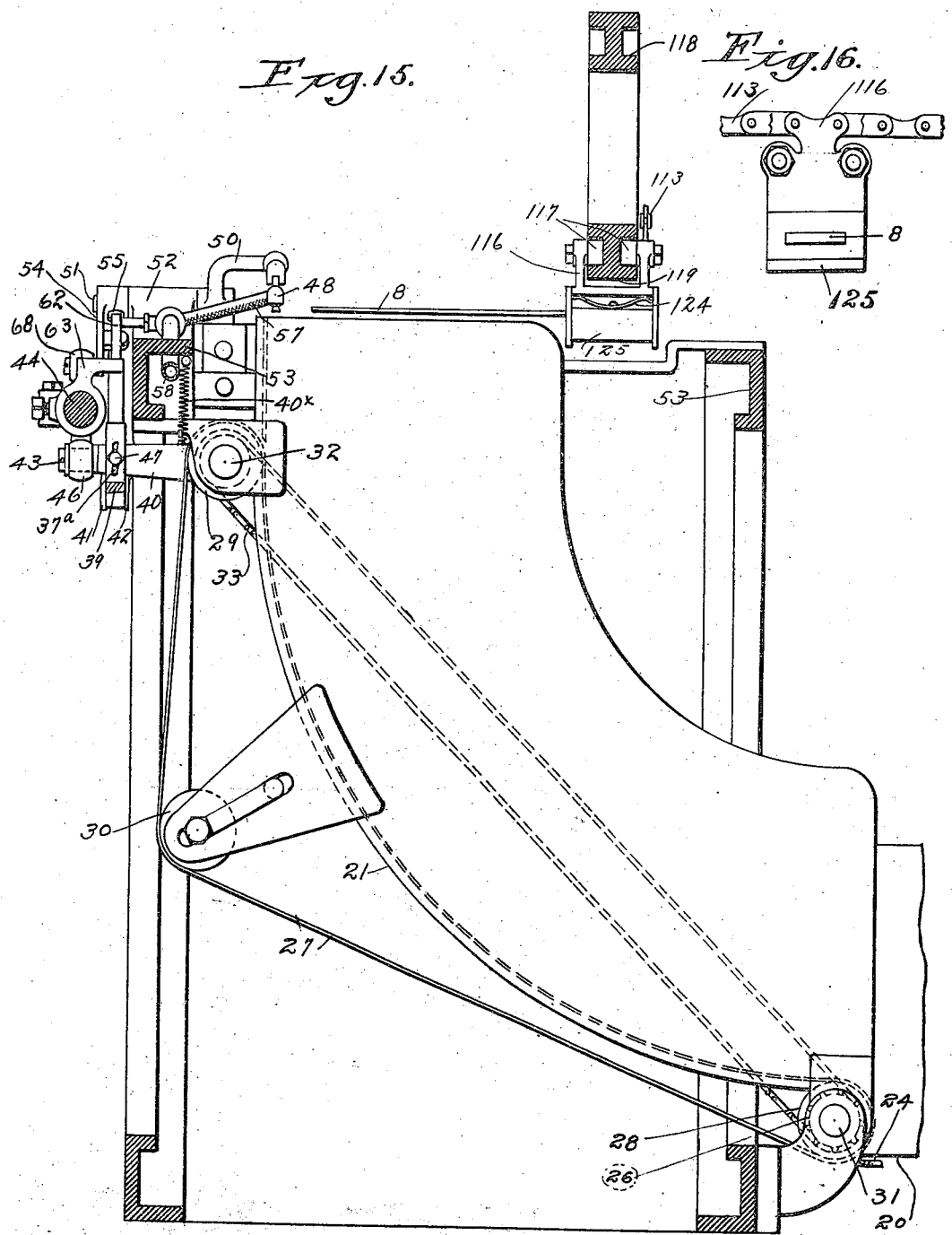

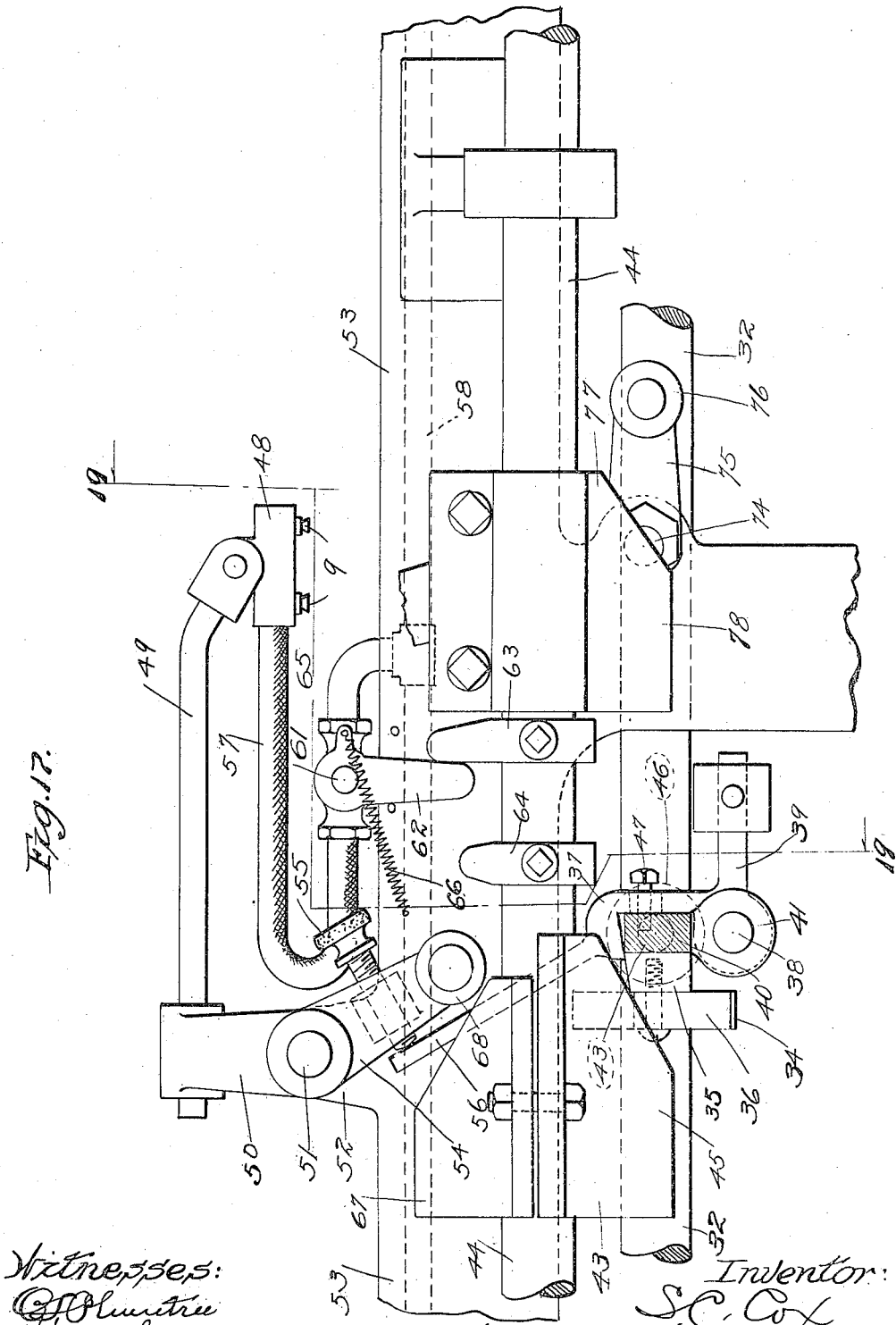

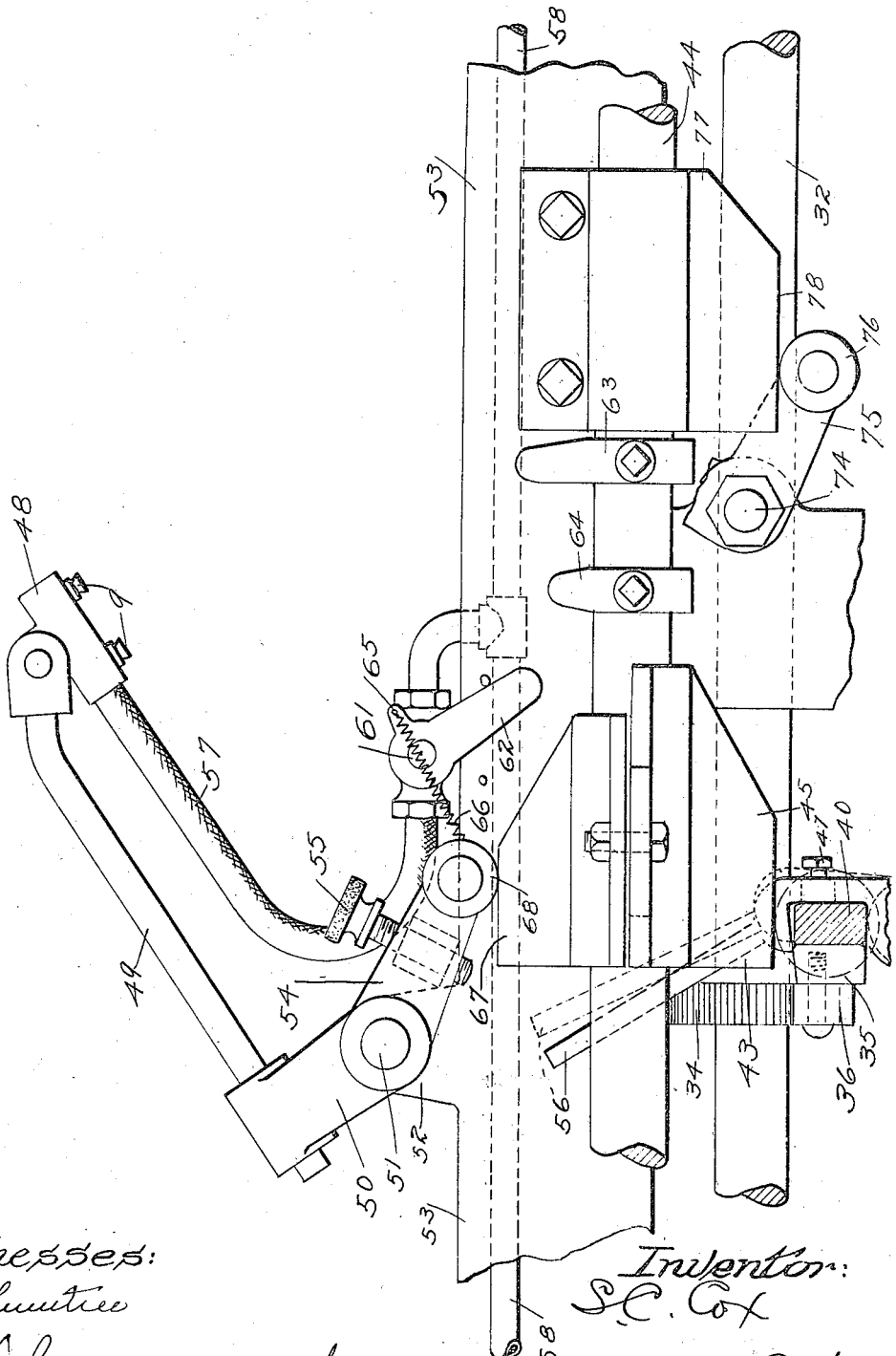

S. C. COX.
SIGNATURE STUFFING MACHINE.
APPLICATION FILED AUG. 3, 1905.
1,043,401.
Patented Nov. 5, 1912.
12 SHEETS—SHEET 12.
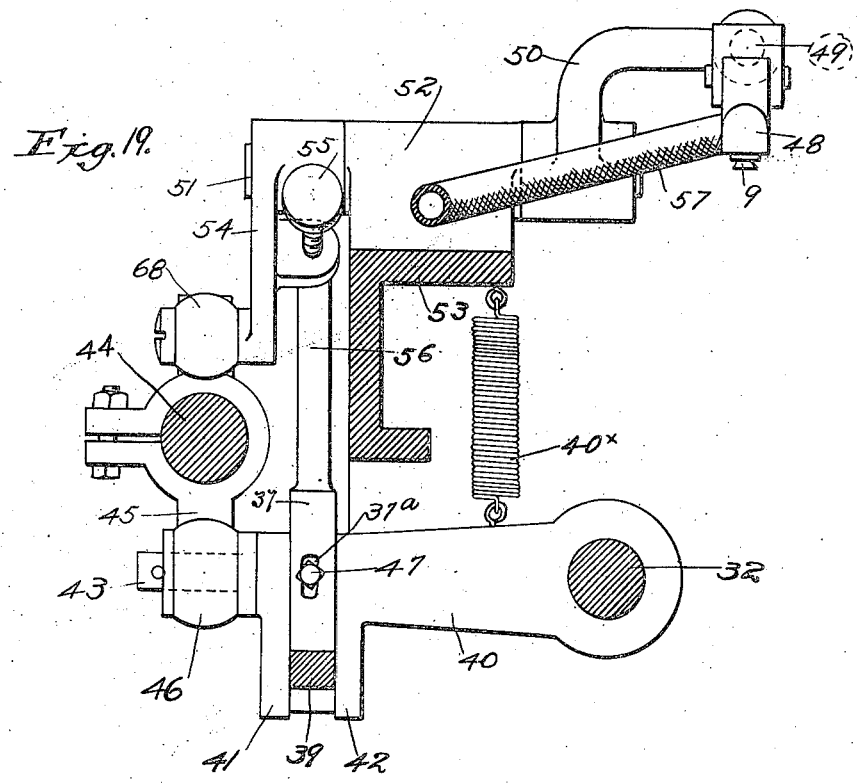
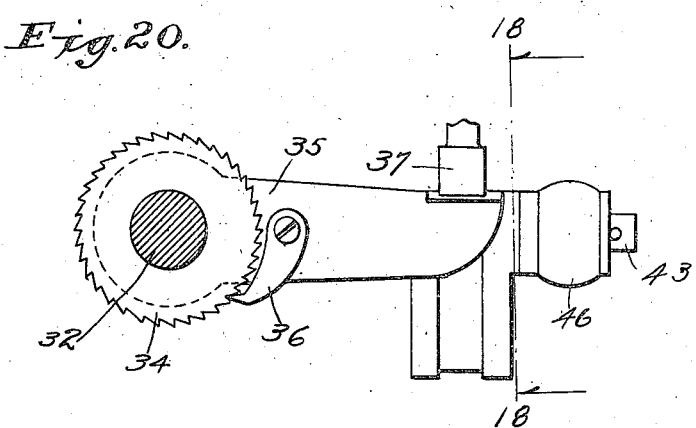

UNITED STATES PATENT OFFICE.

SANDFORD C. COX, OF EDISON PARK, ILLINOIS, ASSIGNOR, BY MESNE ASSIGNMENTS, TO STANDARD ASSEMBLER COMPANY, OF AUGUSTA, MAINE, A CORPORATION OF MAINE.

SIGNATURE-STUFFING MACHINE.

1,043,401.  Specification of Letters Patent.  Patented Nov. 5, 1912.

Application filed August 3, 1905. Serial No. 272,582.

*To all whom it may concern:*

Be it known that I, SANDFORD C. COX, a citizen of the United States, residing at Edison Park, in the county of Cook and State of Illinois, have invented new and useful Improvements in Signature-Stuffing Machines, of which the following is a specification.

This invention relates to means for assembling the folded leaves or sheets of which a book, pamphlet, newspaper, or the like, is composed, or which constitute the various signatures or sections of a book. In some instances this is done by what is known as "stuffing," that is, nesting the folded leaves one within another, while in other cases it is accomplished by "gathering" or stacking the folded leaves.

The invention has for its primary object to provide improved means for accomplishing either or both of these results.

With a view to the attainment of these ends, and the accomplishment of certain other objects, which will hereinafter appear, the invention consists in the features of novelty in the construction, combination, and arrangement of parts which will now be described with reference to the accompanying drawings, and more particularly pointed out in the claims.

Figure 5:
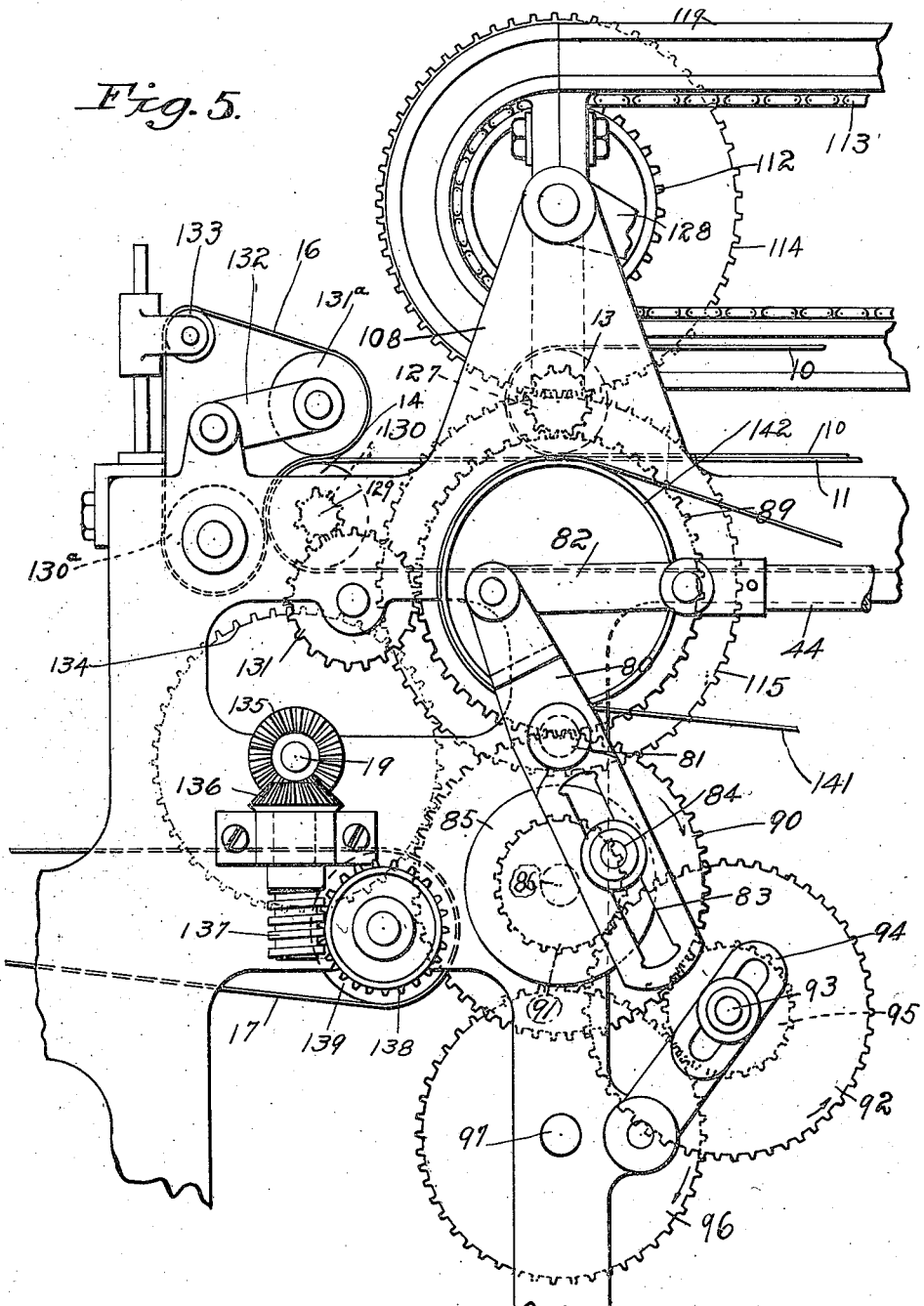
Figure 6:
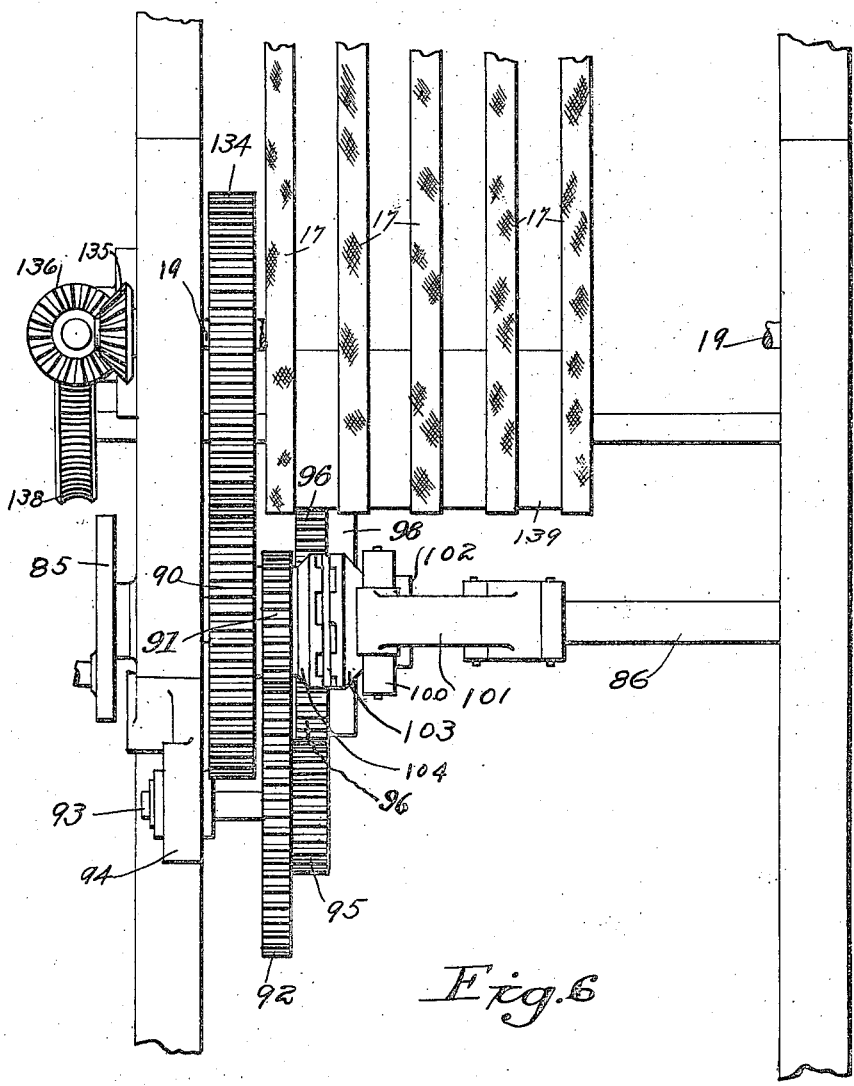

In the said drawing, Figure 1 is a diagrammatic illustration of this improved machine, or the principal parts thereof, showing the manner of its operation. Fig. 2 is a perspective view of one form of the folded leaves which are operated upon by this invention. Fig. 3 is a side elevation of the complete machine. Fig. 4 is a plan view of the machine, partly in horizontal section. Fig. 5 is an enlarged side elevation of the gearing at one end of the machine. Fig. 6 is a plan view thereof. Fig. 7 is a vertical transverse section thereof. Fig. 8 is an enlarged side elevation of one of the fold-supporting blades and its operating mechanism, showing the blade out of action. Fig. 9 is a similar view showing the blade in action. Fig. 10 is a view of the same parts taken at right-angles to Fig. 9 on the line 10, 10, Fig. 9. Fig. 11 is a plan view thereof. Fig. 12 is an enlarged transverse section of the carrier for the stuffing blades, showing one of the stuffing blades in elevation. Fig. 13 is a vertical transverse section of the machine taken on the line 13, 13, Fig. 3, on an enlarged scale. Fig. 14 is a detail view of the means for attaching the follower to the chains. Fig. 15 is a vertical transverse section of the machine taken on the line 15, 15, Fig. 3, on an enlarged scale. Fig. 16 is a detail side elevation of a portion of the chain or conveyer which carries the stuffing blades. Fig. 17 is an enlarged side elevation of one of the suckers and operating mechanism, showing the sucker depressed. Fig. 18 is a similar view showing the sucker elevated, the mechanism being partly in section on the line 18, 18, Fig. 20. Fig. 19 is a vertical transverse section taken on the line 19, 19, Fig. 17. And Fig. 20 is a detail view of the ratchet mechanism constituting a part of the automatic feed hereinafter described.

The invention will first be described as a signature stuffing machine.

The principle of the invention may be best understood from the diagrammatic illustrations in Figs. 1 and 2 of the drawings. Fig. 2 shows an example of one of the many forms of folded sheets of which books, pamphlets and the like are composed, and which are usually nested together or stuffed one within the other until a section of the desired thickness is produced, and which is then stitched or stapled to hold the leaves together, in the production of pamphlets, for example; or a number of such sections are stacked one upon the other and then stitched, after the manner of producing books of greater volume. In this example of a folded sheet it will be seen that the sheet has been folded twice in a manner to produce four leaves, 1, 2, 3, 4, which are independent of each other on two sides of the folded sheet, while they are connected at one of the remaining sides so as to produce in effect but two leaves. These folded sheets are arranged in piles or stacks 5, 6, 7, which are fed upwardly from below by any suitable means, an example of which will be presently described, so as to bring the upper one on each pile within the reach of one or more traveling stuffing blades 8 which engage between the double folds, that is, the fold comprising the leaves 1 and 2, which is the upper fold, and the fold comprising the leaves 3 and 4, which is the lower fold, and thus carry the top sheet from its pile or stack across to the next pile or stack.

Preparatory to the engagement of the folded sheet by the stuffing blade, the upper double fold is raised in the manner shown in the diagram in Fig. 1 by any suitable means, such as a sucker 9, which will be presently described, so as to allow the stuffing blade 8 to enter between the folds. One of these suckers or lifting means 9 is arranged over or contiguous to each of the stacks or piles 5, 6, 7, and is so constructed and operated that before the stuffing blade 8 arrives the folded sheet will be opened in the manner shown in Fig. 2, that is, the upper double fold will be lifted by the engagement of the sucker near its single edge, or edge where it is folded, the dotted circles 9ª, Fig. 2, indicating approximately the point at which the sucker engages the sheet, and consequently the blade 8, which has picked up one of the sheets from the pile or stack 5, will enter between the folds of the top sheet of the stack or pile 6 and carry the sheet from the pile 5 in between the folds of the sheet of the stack 6, and the latter will in like manner be carried from the stack 6 by the same stuffing blade to the next stack 7, where it will carry the sheets from stacks 5 and 6 in between the folds of the top sheet of the stack 7, thus stuffing or nesting the three folded sheets one within the other. In this example of the invention but three of the stacks or piles are shown, but it will nevertheless be understood that the number may be increased indefinitely according to the number of sheets to be stacked or nested in each section or signature. After the sheets thus nested leave the last pile or stack on the stuffing blade 8, they are carried by said blade to any suitable mechanism which will remove them from the blade and place them in appropriate position to be properly handled in the further construction of the book or pamphlet. As an example of such means, I have shown two endless belts or conveyers 10, 11, passing over suitable pulleys or rollers 12, 13, 14, 15, which are driven by suitable means in a direction away from the last stack of sheets, and at a speed greater than the speed of movement of the stuffing blades 8, so that they will serve to strip the leaves from the stuffing blades, allowing the stuffing blade to pass before the end of the top belt or conveyer 10 is reached, the dotted line 8ª indicating the line of travel of the stuffing blade. The lower one of the belts or conveyers 11 is longer than the upper one, so as to support the nested leaves after the blade 8 escapes therefrom, and when the leaves are fully out of reach of the blade they encounter a third belt or conveyer 16, which turns them downwardly around the end of the conveyer 11, and deposits them upon the upper fold of a belt or conveyer 17, which may be of sufficient length to conduct a large number of the nested leaves at one time, and thus hold the leaves in convenient position for handling. In order that the leaves may be laid upon the belt or conveyer 17 in an orderly manner, a series of revolving sockets may be placed between the conveyers 16, 17, in position to receive the nested sheets as they fall. This device consists of a series of curved arms 18, mounted upon a suitable shaft 19, and driven in unison with the rest of the mechanism in any suitable way, as will be hereinafter described. This series of sockets may be useful where it is desirable to deposit the sheets upon a conveyer at a level considerably below the plane of the conveyer 11, but would be of no especial advantage in constructions where the final conveyer 17 is or could be arranged contiguous to the conveyer 11.

Each of the stacks or piles of leaves 5, 6, 7, is placed in a hopper or other suitable means provided with mechanism for maintaining the uppermost one of the folded leaves at a constant level. An example of such a hopper appropriate for this purpose is best shown in Fig. 13 of the drawing, and is seen to consist of a curved trough-like box, which has its lower end extending in a horizontal direction, and provided with a flat or substantially flat bottom 20, upon which the supply of papers or folded sheets is placed, while its upper end curves gradually to a vertical position, as shown at 21, and serves to gradually direct the folded sheets from a vertical to a horizontal plane, the sheets being placed in the hopper with their folded edges (the left-hand edge as shown in Fig. 2) presented downwardly against the bottom 20. After the papers are thus placed in the hopper they are held in a compact form and fed lengthwise and upwardly therein by any suitable follower 22, provided with a hook or other suitable means 23, engaging one or more chains 24 running over the bottom 20 around sprockets 25, 26, and also serving for the direct support of the papers, whereby they will engage the papers individually and urge them forward in the hopper, pressing them continually against the curved bottom or wall 21 up which they slide. Their movement, however, may be facilitated in the curved part of the hopper by one or more belts 27 lying flat against the inner face thereof and running over suitable pulleys 28, 29, and around an idler or tightener 30.
If desired, these belts 27 may be driven in unison with the chains 24 by positive connection with the shaft 31 on which the sprockets 26 are mounted. For that purpose the shaft 31 is connected to shaft 32 by a belt 33, (shown in Fig. 3) which also serves to drive the chains 24.

One of the shafts 32 is provided for each of the hoppers, and each shaft is provided with automatic feed mechanism whereby it is rotated for causing the follower 22 to feed the papers or leaves upwardly as fast as they are removed by the blades 8. As this automatic mechanism is the same for each of the hoppers, the description of one will suffice for all. As shown in Fig. 20, the shaft 32 is provided with a ratchet wheel 34 rigidly fixed thereto in any suitable manner, and mounted loosely upon the shaft is a crank arm or lever 35 carrying a pawl 36 engaging the ratchet 34 and serving to rotate the ratchet in one direction when the arm 35 is oscillated. This oscillation is imparted to the lever 35 at the proper time by means of a hook 37, which is pivoted at 38 to any suitable support, and is provided with a weighted arm 39, (shown more clearly in Fig. 17) adapted to throw the hook out of engagement with the lever 35 when not otherwise restrained. The pivot 38 is mounted upon an arm 40, provided with two flanges 41, 42, (see Fig. 19) between which the hook 37 and arm 39 are situated, and on the end of the arm 40 is formed or secured a pivot 43 carrying an anti-friction roller 46 arranged to be engaged by a cam or incline 45 secured to a longitudinally movable or reciprocating rod 44, which at each stroke is adapted to engage the anti-friction roller 46, and by depressing the arm 40, cause the hook 37 to impart a downward stroke to the lever 35, and thereby turn the ratchet wheel 34 a partial rotation, imparting a similar rotation to the shaft 32, which in turn elevates the supply of papers that is controlled by that particular shaft. The arm 40 may be pivotally mounted upon any suitable support, preferably upon the shaft 32, but is of course loose thereon so as to move independently thereof and is held normally elevated by a spring 40ˣ or other suitable means. As shown in Fig. 17, the hook 37 over-hangs the arm 40, and is limited in its movement toward the lever 35 by an adjustable stop or screw 47 screw-threaded in the arm 40, and which passes through a slot 37ᵃ in the hook 37, and is adapted to engage with its head against the hook 37, and the hook 37 engages the lever 35 only when at the extremity, or substantially the extremity, of its movement toward the arm 40. At all other times the arm 40 will make its oscillating movement without affecting its lever 35, and as a consequence the ratchet 34 will not be rotated and the supply of papers or sheets will not be elevated.

In order that each supply of the papers or sheets may be elevated as required independently of all other stacks or piles, suitable means for controlling the position of the hook 37 with relation to the condition or level of the sheets in the pile belonging to that particular hook are provided, and will now be described (reference being had to Figs. 17, 18 and 19). Over each pile or stack of sheets is arranged a pair of the suckers 9 secured to a sucker box 48, which is pivotally supported by an arm 49 secured in a crank arm 50 mounted upon short shaft 51 in standard 52 on side frame 53. The shaft is also secured to a downwardly extending crank arm 54, which carries an adjusting screw 55 arranged to engage an arm 56 projecting upwardly from hook 37. The sucker 48 is connected by a flexible tube or other suitable means 57 with a line pipe 58 having communication with a suitable exhaust pump 59, preferably through the intermediary of a vacuum tank 60 (see Fig. 3), and between the pipe 58 and sucker 48 is interposed a cock or valve 61, which when opened renders the sucker 48 active and enables it to pick up the upper leaf or fold of the top sheet belonging to the pile or stack over which it rests, in the manner indicated in Figs. 1 and 18, thus allowing the stuffing blade 8 to enter between the folds as before described. The sucker 48 is adapted to gravitate until it comes into contact with the top of the pile of sheets. If the top of the pile is at or above a certain level, the sucker by engagement with the top sheet will prevent the adjusting screw 55 from reaching the arm 56, and as a consequence the weight 39 will hold the hook 37 out of the way of the arm or lever 35, and the oscillation of the arm 40 by the cam 45 will have no effect on the shaft 32; but should the top of the pile fall below such level, the adjusting screw 55 will engage the arm 56 and push the hook 37 over the lever 35, enabling the oscillation of the arm 40 to impart a partial rotation to shaft 32, and by rotating the latter cause the follower 22 to push the papers upwardly in the hopper until the level of the pile becomes such that the engagement of the sucker 48 therewith will hold the adjusting screw 55 aloof from the arm 56 and no longer permit it to keep the hook 37 in engagement with the lever 35. The cock 61 is provided with a lever 62 arranged within the reach of two actuating lugs 63, 64, secured to the rod 44, and it is also provided with a short arm 65, to which is secured a spring 66, so arranged that when the cock 61 is opened the spring will hold it open, and when it is closed it will hold it closed. When the rod 44 moves toward the right the lug 64 engages the lever 62 and opens the cock 61, thereby causing the sucker 48 to take possession of the top fold or leaf of the top sheet, and as it does so, a cam or incline 67, secured to the rod 44, engages the lower end of the crank 54, which is provided with an anti-friction roller 68, for that purpose, and thereby lifts the sucker 48 to the position shown in Figs. 1 and 18, and holds it in this elevated position until the blade 8 passes between the folds of the sheet, whereupon the rod 44 makes a return movement and causes the lug 63 (which is longer than the lug 64) to engage the lever 62 and close the cock 61, whereupon, the vacuum in the sucker 48 being broken, the paper or leaf falls and is carried away by the blade 8, in the manner before described. Thus, while each of the stacks or piles of sheets is provided with this automatic feed mechanism and pneumatic lifting device, it is seen, nevertheless, that the mechanisms for the various piles or stacks act independently of each other so far as feeding the sheets is concerned, but all of the suckers act simultaneously or substantially at one time to lift the top leaf or fold of each pile, so that the top sheet of the succeeding piles in readiness to receive the stuffing blade 8, and the top sheets of the succeeding piles in readiness to receive the sheet carried by said blade from one pile to another, as indicated in Fig. 1.

In order that the top fold may not fall prematurely, or at a time before the blade 8 has had opportunity to fully pass in between the folds of the top sheet, it is desirable to provide auxiliary means for keeping the top fold elevated after it has been lifted by the sucker. For that purpose, an auxiliary supporting blade 69 is employed, (see Figs. 8 to 11) and so constructed and arranged that it will automatically swing in between the folds transversely of the line of movement of the blade 8 after the top fold has been lifted by the sucker 48. This blade 69 is supported by a vertical pivot 70, and is provided with a hub 71, on which is formed or secured a beveled segment 72, and this segment engages with a companion segment 73 journaled upon a pivot 74 and having a crank 75, whereby segment 73 is oscillated, and which crank has an anti-friction roller 76 arranged in the line of movement of a cam or incline 77 secured to the rod 44, so that when the rod 44 makes its stroke to open the cock 61 and elevate the sucker box 48, it will simultaneously throw the auxiliary blade 69 into its operative position shown in Figs. 9, 10 and 11, where it will be held by a straight or horizontal portion 78 of the cam 77 until the cam 77 returns. When the anti-friction roller 76 is thus released, the auxiliary blade 69 is returned to its former position out of the way of the suckers by any suitable means, such as a spring 79 coiled around the hub 71, and having one end attached thereto and the other end secured against the side frame 53.

The rod 44 receives its reciprocating movement from a lever 80 pivoted to the side of the frame at 81, (see Figs. 3, 5 and 7) and having its upper end connected to the rod 44 by a link 82, while its lower end is provided with a slot 83, in which plays a crank pin 84 secured to a crank disk 85 mounted on the outer end of shaft 86 extending across the machine, and which shaft is driven from main driving shaft 87, journaled adjacent thereto and provided with pulley 88, and connected with the shaft 86 through any suitable train of gearing, such for example as a gear 89 on shaft 87, meshing with a gear 90, which is loose on the shaft 86, but which is provided with a rigidly connected pinion 91 engaging with an idler 92 (see Fig. 5) on a stud 93 mounted in an adjustable arm 94, and which idler 92 is provided on one side with a pinion 95 engaging with a gear 96 loosely mounted upon an axle or rod 97, (see Fig. 7) and provided on one side with a cam 98, against which engages a friction roller 99 on one end of a shift lever 100, whose other end has pivotal connection with any suitable support 101, the form of the support shown being an arm which is secured to the rod 97 and is penetrated by the shaft 86 as a means of holding it upright. The shift lever 100 is slidably connected in a well known manner with a hub 102 of one member 103 of a clutch, whose other member is shown at 104, and is secured to or formed on the pinion 91 which is secured to the gear 90. The clutch member 104 is idle on the shaft 86, because it is secured to gear 90, but held against longitudinal movement on said shaft by a collar 105, or any other suitable means, while the clutch member 103 is splined on the shaft 86 by means of the shift lever 100 in a well known manner. This latter clutch member is thrown into engagement with its companion member 104 by a spring 106 when the cam 98 relieves the shift lever 100. By the described construction it will be seen that the shaft 86 may be back-geared to the shaft 87, and is driven through the intermediary of the clutch 103, 104, and when thus back-geared the crank 85 is rotated only during the time that the cam 98 permits the clutch member 103 to engage its companion member, which is once for every revolution of the cam 98. It is obvious, however, that should the arm 94 be adjusted to take the gear 92 out of mesh with pinion 91, and the cam 98 be so turned as to permit the clutch members to engage, the shaft 86 will then be driven in unison with shaft 87 and at the same rate of speed, the gears 89, 90, being equal. The described back-gear connection of the shaft 86, causing it to rotate at a rate of speed considerably less than that of the shaft 87, and only when the cam 98 permits, is utilized only when the machine is used for gathering, as will be later described; but this direct drive of the shaft 86 serves to cause the opening and closing of the cocks 61 and the rising and falling movement of the sucker arms 49 in perfect time with the travel of the blades 8, each time one of the blades passes one of the piles, the effect of such direct gearing and connected parts upon the reciprocating rod 44 being to first shift the rod to open the cocks 61, whereby the suckers 9 will take possession of the top sheet, and at the same time, or shortly thereafter, to elevate the sucker arms 49 for lifting the top sheet, and to hold them elevated until the blades 8 and auxiliary blade 69 enter fairly between the folds, and to then close the cocks 61 so as to break the vacuum in the sucker boxes 48, allowing the top fold to fall, while the auxiliary blade 69 is returned out of the way of the descending sucker box 48 as the stuffing blades 8 proceed with the folded sheets thereon in their continuous travel toward the stripping belts 10, 11. The means for imparting this continuous travel to the stuffing blades and driving the stripping belts 10, 11, at a greater rate of speed will now be explained.

Mounted in suitable bearings 107, 108, at the ends of the machine, are two transverse shafts 109, 110, respectively (see Figs. 3 and 7) on which are respectively secured two sprocket wheels 111, 112, supporting a belt or sprocket chain 113, which is driven by the sprocket 112 from the driving shaft 87 through the intermediary of a gear 114 mounted on shaft 110 and secured to sprocket 112, and a gear 115 secured to driving shaft 87. As better shown in Figs. 12, 15 and 16, the links of the sprocket chain 113 are provided at suitable intervals with hangers 116, which have anti-friction rollers 117, engaging in tracks or ways 118 in opposite faces of the continuous rail 119 supported in a vertical plane at one side of the machine, the tracks or ways 118 being parallel with the line of movement of chain 113, so that the hangers 116 will be properly supported and guided. The hangers 116 are provided with recessed portions 120, in each of which is situated a block 121 having end flanges 122, 123, which hold the block against longitudinal movement, while permitting it to rise and fall in recessed portion 120. To the block 121 in each of the hangers 116 is secured one of the stuffing blades 8, and between the top of the socket 120 and the block 121, or the blade resting upon the block, is interposed a spring 124, which serves to keep the block 121 against the bottom of its socket 120, but in case the blade should encounter an obstruction of any kind tending to elevate it, the spring 124 will permit it to yield without damage. In constructing the device the bottom of the socket 120 may be left open until the block 121 is inserted from below, and then closed by a cap 125.

As shown in Fig. 7, the roller 13, which supports one end of the belt 10, is journaled in hangers 126 suspended from the axle 110, and the roller is provided with a pinion 127, which engages with the gear wheel 89, and thereby imparts rapid traveling movement to the belt 10, which in practice may be constituted by a number of separate tapes, as better shown in Fig. 7. The other belt or tape roller 12 is supported by two arms or hangers 128, which are also secured to the axle 110, this roller 12 being an idler, deriving rotation from the belt or tapes 10. The roller 14 of the belt 11 is journaled in the main frame in any suitable way, and provided with a shaft 129, on which is secured a pinion 130 (see Fig. 5), engaging with an idler 131, which meshes with gear 89, and thereby drives the lower belt 11, which may also be constituted by a series of tapes, at the same rate of speed as the upper belt 10. The other roller 15 of the lower belt, being a mere idler, is journaled in the main frame in any suitable way, as indicated in Fig. 3.

The guide belt 16 derives its motion from frictional contact with the roller 14 or belt 11. As shown in Fig. 5, it is supported by two rollers 130$^a$, 131$^a$; the former of which is journaled in the main frame, while the latter is mounted in pivoted arms 132, whereby the roller 131 will gravitate against the roller 14, and will be capable of rising and falling to accommodate the device to the various thicknesses of the signatures. 133 is any suitable tightening roller for the belt 16.

The shaft 19 is driven by a gear 134, (as shown in Fig. 5) which meshes with the gear 90, and the conveyer 17 is driven from the shaft 19 by bevel gears 135, 136, the former of which is secured to shaft 19, and the latter to a worm-shaft 137, which meshes with a worm-wheel 138 on the driving roller 139 of the conveyer belt 17, thereby imparting a slow rate of travel to the conveyer belt, so that the signatures will be laid thereon one upon the other, one slightly in advance of another.

The pump 59 is driven by a crank 140, having any suitable connection with the driving shaft 87, such as a chain or belt 141 and pulleys 142, 142$^a$, secured to the shaft 87 (see Fig. 4).

The employment of the machine for the purpose of gathering, will now be described.

It has already been explained that the action of the belts 11, 17, is to lay whatever is taken from the blades 8 upon the belt 17 in different positions with respect to the length of belt 17, so that the various deposits of the arms 18 will lie on the belt 17 in overlapping relation to each other. Now, if the construction be such that each blade 8 will carry but one sheet it is apparent that the sheets will fall singly upon belt 17, one upon the other, in convenient position to be removed in piles by an attendant and secured together in the form of signatures. This is accomplished when gear 92 is thrown in engagement with pinion 91, as it makes the suckers dwell in their operation a sufficient length of time to permit the blade 8 at each pile to pass all of the succeeding piles before the top fold of another sheet in advance thereof is raised, and hence each blade will take but one sheet. By throwing the back-gearing into operation the time of operation of the suckers and auxiliary supporting blades is postponed until the gathering blades 8 thus pass the piles in advance of those from which they receive their sheets, because the crank 84 then operates only when the cam 98 permits the clutch to engage and the speed of rotation of the cam is dependent upon the relative sizes of the train of back-gearing. These relative sizes are determined by the number of piles of folded leaves employed in the machine. In this example, there are three, and consequently the rotation of cam with respect to the movement of the gathering blades will be one rotation of the cam to a length of travel of each blade, equal approximately to the distance between the outer edges of the end piles.

I claim:

1. In a machine for the purpose described, the combination of means for engaging the exposed face of the top fold of one of a number of horizontal folded sheets to be stuffed one into the other and lifting said fold, and positive means for carrying another folded sheet in between said folds and while the latter are thus held separated.

2. In a machine for the purpose described, the combination of means for engaging the exposed face of the top fold of one of a number of horizontal folded sheets to be stuffed one into the other and lifting said fold, and positive means operatively connected with said first means for carrying another of said folded sheets between said folds while the latter are thus held open.

3. In a machine for the purpose described, the combination of means for holding a plurality of supplies of folded sheets in a horizontal position, means for separating the folds of the uppermost exposed sheet of each supply, and positive means for conducting the folded sheets from one supply to another and forcing them between the said separated folds of the sheets of said other supply.

4. In a machine for the purpose described, the combination of a traveling gathering member, means for holding a plurality of supplies of folded sheets horizontally, means for holding open the folds of the uppermost of a plurality of exposed folded sheets across the line of movement of said member, and means for moving said member across the supplies of folded sheets whereby the member will pass between the open folds.

5. In a machine for the purpose described, the combination of a traveling gathering member, means for holding a plurality of piles of folded sheets horizontally, and means for engaging the exposed face of the top fold of each of the piles of folded sheets and lifting the folds to a position across the line of movement of said member.

6. In a machine for the purpose described, the combination of a traveling gathering member, means for holding open the folds of a plurality of folded sheets across the line of movement of said member, said member passing successively into the open folds of the sheets and movable means for removing the gathered sheets from said member.

7. In a machine for the purpose described, the combination of a traveling gathering member, means for holding open the folds of a plurality of folded sheets across the line of movement of said gathering member, and means moving at a greater rate of speed than said gathering member for stripping the sheets therefrom.

8. In a machine for the purpose described, the combination of means for holding a plurality of supplies of folded sheets horizontally, means for maintaining the top exposed sheets of said supplies at the same elevation, means for holding open the folds of the top sheets of said supplies, and a gathering means movable across said supplies and successively engaging the sheets for stuffing the top sheet of one supply into the top sheet of the next supply.

9. In a machine for the purpose described, the combination of a traveling gathering member, means for engaging and holding open the top folds of each of a plurality of horizontal folded sheets in the line of movement of said member, means for removing the gathered sheets from said member, and means for laying the assemblages of sheets thus produced one upon the other, one in advance of another.

10. In a machine for the purpose described, the combination of a traveling gathering member, means for holding a plurality of supplies of horizontal folded sheets, a sucker for each of said supplies for lifting the top fold of the top sheet on each supply, and an auxiliary holding means movable between the folds of the top sheet for keeping the same elevated until the gathering member enters between the folds.

11. In a machine for the purpose described, the combination of a series of traveling sheet-collecting devices, means for supporting a plurality of supplies of sheets, means for presenting the sheets of said supplies to said collecting devices as the latter pass, and means whereby the time of operation of said sheet-presenting means may be varied with respect to the speed of travel of the sheet-collecting devices.

12. In a machine for the purpose described, the combination of means for holding a plurality of supplies of folded sheets, means for engaging the exposed sides of the outermost sheets and opening them away from their companion fold whereby the sides of the outermost sheets are held separated, and positive means for carrying a folded sheet from one supply between the said separated sides.

13. In a machine for the purpose described, the combination of a traveling gathering member, means for holding open the folds of a plurality of folded sheets across the line of movement of said member, and means moving in the same direction with the member for removing the gathered sheets from the said member.

14. In a machine for the purpose described, the combination of a series of traveling collecting devices, means for supporting a plurality of supplies of folded sheets, means for holding open one of the sheets of each of the supplies to each of said collecting devices as the latter pass, means for operating the said holding devices to permit each collecting device to successively gather a plurality of sheets, and means for controlling said holding devices to cause the latter to hold open a sheet from only one of said supplies to the respective collecting devices.

15. In a machine for the purpose described, the combination of a series of traveling collecting devices, means for supporting a plurality of supplies of folded sheets, means for holding open one of the sheets of each of the supplies to each of the said collecting devices as the latter pass, means for operating the said holding devices to permit each collecting device to gather a plurality of sheets, and means for controlling said holding devices to cause the latter to hold open a sheet from only one of said supplies to the respective collecting devices, said collecting devices including a shiftable gear and a pinion operatively related to the said holding means.

In witness whereof, I have hereunto set my hand this 31st day of July, 1905, in the presence of the subscribing witnesses.

SANDFORD C. COX.

Witnesses:
 FRANCIS A. HOPKINS,
 CHAS. H. SEEM.